(12) United States Patent
Tabuchi et al.

(10) Patent No.: US 12,116,495 B2
(45) Date of Patent: Oct. 15, 2024

(54) DECORATIVE SHEET, DECORATIVE PLATE, AND INKJET INK FOR DECORATIVE SHEET

(71) Applicant: TOPPAN INC., Tokyo (JP)

(72) Inventors: Erika Tabuchi, Tokyo (JP); Yasushi Ooe, Tokyo (JP); Yumi Nakayama, Tokyo (JP); Ayumi Shioda, Tokyo (JP)

(73) Assignee: TOPPAN INC., Tokyo (JP)

( * ) Notice: Subject to any disclaimer, the term of this patent is extended or adjusted under 35 U.S.C. 154(b) by 0 days.

(21) Appl. No.: 17/752,190

(22) Filed: May 24, 2022

(65) Prior Publication Data

US 2022/0282104 A1 Sep. 8, 2022

Related U.S. Application Data

(63) Continuation of application No. PCT/JP2020/043890, filed on Nov. 25, 2020.

(30) Foreign Application Priority Data

Nov. 29, 2019 (JP) .................................. 2019-216577

(51) Int. Cl.
*B32B 3/10* (2006.01)
*C09D 11/322* (2014.01)
*E04F 13/08* (2006.01)

(52) U.S. Cl.
CPC ........ *C09D 11/322* (2013.01); *E04F 13/0866* (2013.01)

(58) Field of Classification Search
None
See application file for complete search history.

(56) References Cited

U.S. PATENT DOCUMENTS

2006/0139406 A1 6/2006 Tsuchiya et al.
2012/0043510 A1* 2/2012 Kurihara ............. C09D 5/24
977/773

FOREIGN PATENT DOCUMENTS

EP 2 420 336 A1 2/2012
JP 2001-71447 A 3/2001
(Continued)

OTHER PUBLICATIONS

Machine translation of JP-2019019234-A (Year: 2019).*
(Continued)

*Primary Examiner* — Christopher M Polley
(74) *Attorney, Agent, or Firm* — Foley & Lardner LLP

(57) ABSTRACT

A decorative sheet and a decorative plate having both high luminance and high designability, and an inkjet ink for the decorative sheet used for producing the decorative sheet and the decorative plate. The decorative sheet according to an aspect of the present invention is provided with at least a lustrous layer which is an inkjet printed layer formed by using an inkjet ink on a base sheet, and the inkjet ink contains silver nanoparticles. The decorative plate according to an aspect of the present invention is provided with a decorative sheet and a substrate which is arranged on the side of the decorative sheet facing the substrate sheet. The inkjet ink for a decorative sheet according to an aspect of the present invention is an inkjet ink for a decorative sheet for forming a lustrous layer on a substrate sheet by an inkjet printing method, and contains silver nanoparticles.

7 Claims, 6 Drawing Sheets

(56) References Cited

FOREIGN PATENT DOCUMENTS

| JP | 2003-266610 A | 9/2003 |
|---|---|---|
| JP | 2004-299378 A | 10/2004 |
| JP | 4725226 B2 | 7/2011 |
| JP | 4834981 B2 | 12/2011 |
| JP | 6107180 B2 | 4/2017 |
| JP | 2017-202592 A | 11/2017 |
| JP | 2018-43519 A | 3/2018 |
| JP | 2018-103616 A | 7/2018 |
| JP | 2019-19234 A | 2/2019 |
| JP | 2019019234 A * | 2/2019 |
| JP | 2019-155916 A | 9/2019 |
| JP | 2020183486 A * | 11/2020 |
| WO | WO 2019/131435 A1 | 7/2019 |

OTHER PUBLICATIONS

Machine translation of JP-2020183486-A (Year: 2020).*
Extended European Search Report issued in connection with EP Appl. Ser. No. 20891561.1 dated Nov. 29, 2022.
International Searching Authority, "International Search Report," issued in connection with International Patent Application No. PCT/JP2020/043890, dated Jan. 26, 2021, 7 pages.
International Searching Authority, "Written Opinion," issued in connection with International Patent Application No. PCT/JP2020/043890, dated Jan. 26, 2021, 4 pages.

* cited by examiner

DECORATIVE SHEET, DECORATIVE PLATE, AND INKJET INK FOR DECORATIVE SHEET

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2020/043890, filed on Nov. 25, 2020, which is based upon and claims the benefit of priority to Japanese Patent Application No. 2019-216577, filed on Nov. 29, 2019; the disclosure of which is incorporated herein by reference in its entirety.

TECHNICAL FIELD

The present invention relates to decorative sheets, decorative plates, and inkjet inks for decorative sheets for use in interior materials such as wall materials, ceiling materials, floor materials, or construction materials in buildings such as houses, fittings, furniture and fixtures, exteriors of housing equipment or home appliances, and vehicle interiors such as automobiles.

BACKGROUND

Lustrous printed matter is usually widely used in various applications (for example, PTL 1 and 2) in order to derive unique benefits of design of the lustrous printed matter which reflects light with which the lustrous printed matter is illuminated. The lustrous printed matter is formed by printing a lustrous pattern on a substrate using lustrous ink. The lustrous ink is made by kneading metallic powders such as scale-like aluminum powders (aluminum flakes) or lustrous pigment such as pearlescent pigments (pearl pigments) such as titanium dioxide-coated mica into a selected binder resin.

For example, for the surface decoration of building materials, furniture, housings of household electric appliances, a lustrous layer is added to a wood grain pattern in order to reproduce deep shiny wood textures unique to natural wood using printing technology. Various lustrous decorative sheets and decorative plates (hereinafter simply referred to as "decorative sheet") that express lustrous designs such as a silk tone, a pearl tone or a metallic tone in stone grain patterns, abstract patterns and the like other than wood grain patterns are used in a wide range of fields.

Various kinds of lustrous pigments having particle sizes ranging from several micrometers to 100 μm or more are commercially available. For lustrous decorative sheets using a printing technique, metallic inks (sometimes called mirror ink, RIGEL ink, hologram ink, or STELLA ink, depending on the shape of the powder) such as silver ink are kneaded with this lustrous pigment. A lustrous pigment having an average particle size of less than approximately 30 μm are generally used due to the restrictions on the printability of pearlescent inks.

Today, inkjet printing has been put to practical use in various fields and applications, and therefore is widely used. For example, also in general households, inkjet printing is often used as an output device of a personal computer or as a printer for printing New Year's cards and photographs. Also, in industrial applications, inkjet printing is often used as a bar code printer or commercial printed materials such as signboards, POP advertisements, and advertising media.

The primary advantage of inkjet printing is that the printer is relatively inexpensive and provides high image quality. Although inkjet printing is one method of printing, without the need of a printing plate, a target printed matter is obtained using data from a personal computer or a dedicated device. This not only saves the cost of printing plates, but also has many advantages such as reducing the time required for printing and simplifying the trial printing process which is known as proof printing.

The conventional decorative sheet is, therefore, configured to have patterns printed using gravure printing. Gravure printing has the advantage of being able to print large quantities at high speed. However, gravure printing is not economical when only a small amount of printing is to be performed, and may not be suitable in terms of print quality when the pattern is complex. Therefore, the technique disclosed in PTL 3 has been proposed to use inkjet printing for printing a decorative sheet. For example, in order to improve designability of the decorative sheet, a lustrous pigment may be mixed with the inkjet ink to add luster to the inkjet printed layer.

The techniques disclosed in PTL 4 and PTL 5 have a problem unique to inkjet printing in that the inner diameter of the nozzle needs to be reduced to the order of 10 μm for discharging minute droplets. However, because many of the lustrous pigments have a large particle size, the ink in which the lustrous pigments are dispersed has a problem of clogging of the nozzle which may lead to unstable discharge of the ink. In general, it is difficult to print with inkjet ink mixed with lustrous pigments, and the lustrous layer can only be used as a solid film by a coating method or by other methods such as gravure printing, as shown in PTLs 1 and 2. These methods generally have low designability and complicated printing processes. Conventional decorative sheets have the problem that not many of them have both high luminance and high designability.

[Citation List] [Patent Literature] [PTL 1] JP 4725226 B; [PTL 2] JP 6107180 B; [PTL 3] JP 2001-71447 A; [PTL 4] JP 2004-299378 A; [PTL 5] JP 4834981 B.

SUMMARY OF THE INVENTION

Technical Problem

The present invention has been developed in view of the above problems and circumstances. The present invention has an object to provide a decorative sheet and a decorative plate having both high luminance and high designability, and to provide an inkjet ink for the decorative sheet used for producing the decorative sheet and the decorative plate. More specifically, the present invention aims to provide a decorative sheet and a decorative plate having high luminance, and an inkjet ink for the decorative sheet. The decorative sheet and the decorative plate having high luminance are realized by adding a silver nanoparticle to ink for printing a luminance pattern printed layer formed by an inkjet printing method.

Solution to Problem

To solve the above problem, a decorative sheet according to an aspect of the present invention includes a base sheet and an inkjet printed layer which is formed on the base sheet using inkjet ink which contains a silver nanoparticle.

A decorative plate according to an aspect of the present invention includes the decorative sheet, and a substrate arranged on the base sheet side of the decorative sheet.

An inkjet ink for a decorative sheet according to an aspect of the present invention is used for forming, on a base sheet, a pattern printed layer by an inkjet printing method, and the inkjet ink contains a silver nanoparticle.

Advantageous Effects of the Invention

The present invention provides a decorative sheet and a decorative plate having both high luminance and high designability, as well as an inkjet ink for decorative sheets used to produce the decorative sheet and the decorative plate. Specifically, the present invention uses an inkjet ink for decorative sheets containing a silver nanoparticle, so that a picture printed layer having luster can be printed by inkjet printing method, and a decorative sheet and a decorative plate having high luminance can be obtained without the need for a printing plate.

DETAILED DESCRIPTION

Figure 1:
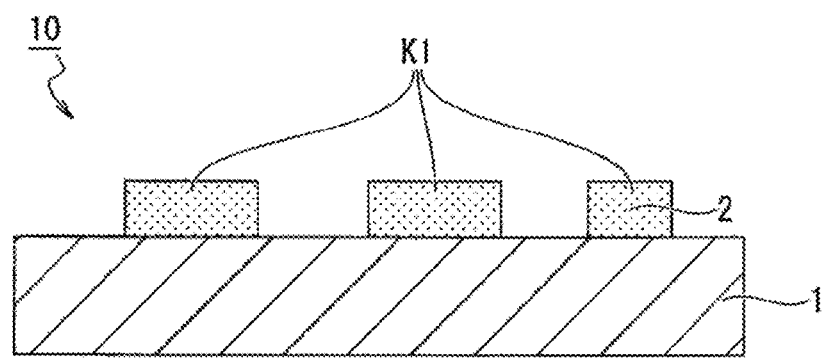
FIG. 1 is a schematic cross-sectional view illustrating a configuration of a decorative sheet according to a first embodiment of the present invention.

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

The decorative sheet according to the embodiments of the present invention all have the common feature of having at least an inkjet printed layer formed on the base sheet using an inkjet ink which contains a silver nanoparticle. A method for easily determining whether a lustrous layer, which is a printed layer imparted with luminosity by including a silver nanoparticle, is formed by an inkjet printing method, is to see whether the lustrous layer is printed in brown or in multiple colors of red, blue, yellow, and black when, for example, a pattern such as a wood grain pattern on the printed layer is observed in an enlarged manner by a loupe or the like.

It has been difficult to produce inkjet ink using a lustrous pigment, and although devices capable of discharging them exist, they are still limited. Additionally, there were many cases in which printing with the desired design was difficult due to insufficient brightness or excessive brightness.

The present inventors have found that by using an inkjet ink (hereinafter referred to simply as "silver nanoparticle ink") containing silver nanoparticles for printing a lustrous layer, and by preferably selecting the particle size and concentration of the silver nanoparticles, the luminance can be adjusted, and thus both the designability and the luminance of the inkjet ink can be enhanced. Additionally, the present inventors have also found that for example, a design of a pearl tone which is characterized by thin lines or gradations unique to building materials, or a design of a light gloss which is difficult to express by an ink using aluminum can be printed and reproduced.

The composition of the silver nanoparticle ink used in the present embodiment is described in detail below.

The surface of the silver nanoparticle used in the present embodiment is covered with a protective molecule which contains an amine compound as a main component. The "main component" described here refers to the most abundant component (molecule) among the plurality of protective molecules covering the surface of the silver nanoparticle.

The silver nanoparticle according to the present embodiment have, for example, a median diameter (D50) in the range of 1 nm or more and 250 nm or less, and can be dispersed in a dispersion medium such as an organic solvent or water. If the median diameter (D50) of silver nanoparticles is smaller than 1 nm, visibility (luminosity) may be reduced, and if the median diameter (D50) of silver nanoparticles is larger than 250 nm, dispersibility may be reduced. The average primary particle size was obtained from the particle size distribution measured with a 0.1 mass % dispersion liquid using a Nanotrac UPA-EX 150 particle size analyzer (dynamic light scattering method, Nikkiso Co., Ltd.).

There is no particular limitation on the shape of the silver nanoparticles, but it is particularly preferable to include one or more shapes, such as spherical, flat, polygonal, or the like. Flat silver nanoparticles have a large surface area and thus are expected to have good visibility (luster) even with a small number of particles. Spherical silver nanoparticles are expected to stabilize the size of the nanoparticles and this causes the nanoparticles to be arranged without gaps. Therefore, spherical silver nanoparticles are expected to have good visibility (luster).

Among silver-containing compounds, silver compounds which are easily decomposed by heating to produce metallic silver are preferably used as the raw material of silver that constitutes the silver nanoparticles.

Such silver compounds include, for example, silver carboxylate, in which silver is compounded with carboxylic acids such as formic acid, acetic acid, oxalic acid, malonic acid, benzoic acid, and phthalic acid, as well as silver chloride, silver nitrate, and silver carbonate. Among the above silver compounds, silver oxalate is preferably used from the viewpoint that it easily produces metal by decomposition and is less likely to produce impurities other than silver.

Silver oxalate has a high silver content, and oxalate ions are decomposed and removed as carbon dioxide by heating. This is advantageous in that metallic silver can be obtained as it is by thermal decomposition without the need of a reducing agent, and impurities are less likely to remain.

When the silver compound is thermally decomposed, an alcohol, a fatty acid, a polymer or the like may be added. These additions are expected to contribute to adjustment of the particle size, change in good dispersion medium, and improvement in the dispersion stability. Examples of the alcohol include methanol, ethanol, and 1-propanol. Examples of the fatty acid includes oleic acid and linoleic acid. Examples of the polymer includes polyvinyl pyrrolidone and gelatin.

The amine compound which protects the surface of the silver nanoparticle is not particularly limited in its structure, but preferably has $RNH_2$ (R is a hydrocarbon group) which is a primary amino group from the point of ease of coordination to the silver atom. A secondary amino group can also be coordinated, but the reactivity is lower than that of the primary amino group.

A diamine compound having a plurality of amino groups may also be used. When a diamine compound includes a primary amino group and a tertiary amino group, the primary amino group is selectively coordinated to the silver atom and the bulky tertiary amino group is directed outward, and thus the surface of the silver nanoparticle is easily protected.

Examples of amines include ethylamine, n-propylamine, isopropylamine, 1,2-dimethylpropylamine, n-butylamine, isobutylamine, n-nonylamine, n-aminodecane, n-aminoundecane, n-hexadecylamine, n-heptadecylamine, n-octadecylamine and n-oleylamine.

Examples of the diamine include, but are not limited to, N, N-dimethylethylenediamine, N, N-diethylethylenediamine, N, N-dimethyl-1, 3-propanediamine, N, N-diethyl-1, 3-propanediamine, N, N-dimethyl-1, 5-diamino-2 methylpentane, N, N-dimethyl-1, 6-hexanediamine, N, N-dibutylaminopropane, N, N-diisobutyl 1, 3-diaminopropane, and the like. A plurality of different amines may also be used simultaneously.

The silver nanoparticle used in the present embodiment may be produced via a silver oxalate amine complex, for example, by mixing silver oxalate with an amine and thermally decomposing them. A technique for producing a silver nanoparticle by thermally decomposing silver oxalate and an amine are disclosed, for example, in JP 2012-162767 A and JP 5574761 B. The above-described method does not require mixing of a reducing agent for reducing silver ions, and a silver nanoparticle can be produced by a simple method. Additionally, the silver nanoparticle obtained by the above-described method mainly have amino groups of amine molecules coordinated on the surface of the silver particles and have high dispersibility in the dispersion medium. Further, since the size and dispersibility of the particles can be changed depending on the conditions of production, silver nanoparticle ink using these silver nanoparticles can express designs having adjusted luminosity depending on the silver nanoparticles used and their concentration.

There is also a method for producing silver nanoparticles by using polyvinylpyrrolidone as a molecule coordinated to the surface of the particles during thermal decomposition of silver oxalate (see Reference 1 below). The silver nanoparticles synthesized by this method include plate-like particles, which are expected to have high brightness when printed.

[Reference literature 1] T. Togashi, S. Ojima, I. Sato, K. Kanaizuka, and M. Kurihara, Chem. Lett., 2016, 45, 646-648

The amount of silver nanoparticles added in the coating liquid is preferably in the range of 1 mass % or more and 50 mass % or less with respect to the dispersion medium, for example. The amount of silver nanoparticles added is particularly preferable to be 15 mass % or more, since the metallic luster becomes stronger. When the amount of silver nanoparticles added is less than 1 mass %, visibility (luster)

as printed matter may decrease, and when the amount of silver nanoparticles added is more than 50 mass %, dispersibility may decrease.

When the silver nanoparticles according to the present embodiment are dispersed in a solvent or the like used as a dispersion solvent, a dispersant may be used. Dispersants can be broadly classified as anionic, cationic, or nonionic, and appropriately selected according to the potential of the particle surface and the dispersion medium. Typical anionic systems are sulfate ester, phosphate ester, carboxylic acid, and sulfonic acid types, and most of them have molecular structures of ethylene oxide (EO) addition type. Cationic systems can be classified as quaternary ammonium salt type, Cl salt type, non-Cl salt type, and EO addition type. Nonionic systems can be broadly classified into alkylene oxide addition type and alkanolamide type. Since the surface modification of the silver nanoparticles according to the present embodiment is an amine complex, anionic systems are particularly preferred. Specifically, a polyoxyethylene alkyl ether phosphate (salt), a polyoxyethylene alkyl ether sulfate, a polyoxyethylene alkyl ether acetate, a polyoxyethylene alkyl ether succinate, and the like are preferred, and a polyoxyethylene alkyl ether phosphate (salt) is particularly preferred. Specifically, Phosphanol RB-40, RD-510Y, RD720N, RL-210, RS-410 (TOHO Chemical Industry Co., Ltd.), NIKKOL DDP-8NV, DDP-2, DDP-4, DDP-6, DDP-8, DDP-10 (Nikko Chemicals Co., Ltd.), Plysurf A212C, A215C, A208F, M208F, A208A, A208B, A210B, A219B, DB-01, AL, DBS (DKS Co. Ltd.), and the like, but are not limited to these.

The silver nanoparticle ink according to the present embodiment may have additives such as dyes, defoaming agents, leveling agents, and curing agents in addition to the dispersants described above.

Examples of the dispersion medium of the silver nanoparticle ink according to the present embodiment include water, ethanol, 2-propanol, 1-butanol, methyl ethyl ketone, ethyl acetate, toluene, cyclohexanone, terpenes such as terpineol, and the like. The dispersion medium may be used by appropriately mixing the above-described components according to the physical properties of the target coating liquid.

The mixing ratio of the above components in the coating liquid is not particularly limited, but when it is necessary to prevent the coating liquid from drying in the nozzle as in the inkjet printing method, it is more preferable that one or more organic solvents having a boiling point of 110° C. or higher, such as glycerin, propylene glycol, 1-butanol, cyclohexanone, and terpineol, are contained in the coating solution for inkjet coating (silver nanoparticle ink) in a total of 1 mass % or more. When the content of the above-described components in the coating liquid is less than 1 mass %, the coating liquid tends to dry, which may cause nozzle clogging. There is no upper limit to the amount of the above-described components, but if the amount is too large, the time required for drying the coating solution may be extended.

The color of the layer (inkjet printed layer) printed with the silver nanoparticle ink according to the present embodiment can express, but is not limited to, blue, green, yellow, red, as well as other colors derived from the localized surface plasmon resonance of silver nanoparticles, in addition to silver derived silver. The size and the shape of the silver nanoparticles, surface modification, ink concentration, and the density of the particles on the substrate all affect the color.

The configuration of the decorative sheet according to each embodiment of the present invention will be described below.

First Embodiment

FIG. 1 is a schematic cross-sectional view illustrating a configuration of a decorative sheet 10 according to a first embodiment of the present invention. The decorative sheet 10 according to the first embodiment includes a base sheet 1, and on the base sheet 1, a silver pattern printed layer (lustrous pattern printed layer) 2 is formed by an inkjet printing using silver nanoparticle ink. The silver pattern printed layer 2 formed using the silver nanoparticle ink simultaneously serves as a lustrous layer K1, and has a function of imparting brightness to the decorative sheet 10 and a function of enhancing designability of the decorative sheet 10. The color of the "silver pattern printed layer 2" according to the present embodiment is not limited to silver (silver color). This is because, as described above, the color of the silver nanoparticles depends on the size and the shape of the contained silver nanoparticles, surface modification, ink concentration, and the density of the particles on the substrate. In the present embodiment, the lustrous pattern printed layer formed by containing silver nanoparticles is referred to as a "silver pattern printed layer" for convenience, to distinguish the "silver pattern printed layer" from the "color pattern printed layer" described below.

The silver pattern printed layer 2 is preferred to contain silver nanoparticles in an amount of 90 mass % or more, more preferably 95 mass % or more, and even more preferably 98 mass % or more, relative to the total mass of the silver pattern printed layer 2. When the content of the silver nanoparticles is 90 mass % or more, a brightness can be effectively imparted to the silver pattern printed layer 2.

The thickness of the silver pattern printed layer 2 is preferably in the range of 5 nm or more and 500 nm or less, and more preferably in the range of 10 nm or more and 400 nm or less. When the thickness of the silver pattern printed layer 2 is within the above numerical value range, the inkjet printed layer printed by the inkjet printing method can be effectively given luminosity.

As shown in FIG. 1, the silver pattern printed layer 2 may be formed to cover at least a part of the surface of the base sheet 1, or may be formed to cover the entire surface of the base sheet 1.

The material of the base material sheet 1 may be flexible, thermoplastic, formable, and printable polyvinyl chloride (PVC) resin, or acrylic resin, polyolefin-based polypropylene resin, or polyethylene resin, polycarbonate resin, all in sheet form. Other than the above, paper, steel sheet, wood, all in sheet form may also be used. These may be appropriately selected according to the application and specifications of the base sheet 1.

Second Embodiment

Figure 2:
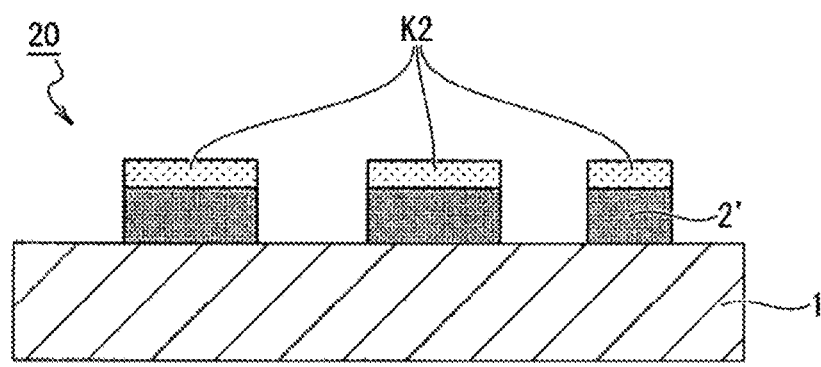
FIG. 2 is a schematic cross-sectional view illustrating a configuration of a decorative sheet according to a second embodiment of the present invention.

FIG. 2 is a schematic cross-sectional view illustrating a configuration of a decorative sheet 20 according to a second embodiment of the present invention. The decorative sheet 20 according to the second embodiment has a pattern made using coloring ink is formed as a color pattern printed layer 2'. On the color pattern printed layer 2', a silver pattern printed layer 2 (lustrous layer K2) using silver nanoparticle ink is formed by an inkjet printing method. Therefore, the decorative sheet 20 according to the second embodiment becomes a decorative sheet 20 having high design qualities such that the lustrous layer K2 shows a sense of brightness colored with an arbitrary color. The color pattern printed layer 2' can be formed by a printing method such as gravure printing or inkjet printing.

The thickness of the color pattern printed layer 2' is not particularly limited and may be set as appropriate.

The color pattern printed layer 2 is a layer that does not contain silver nanoparticles. Since the color pattern printed layer 2' does not contain silver nanoparticles, the brightness of the silver pattern printed layer 2 formed on the color pattern printed layer 2' tends to be more prominent.

As shown in FIG. 2, the silver pattern printed layer 2 (lustrous layer K2) may be formed to cover the entire surface of the color patter printed layer 2', or may be formed to cover a part of the surface of the color pattern printed layer 2'.

Third Embodiment

Figure 3:
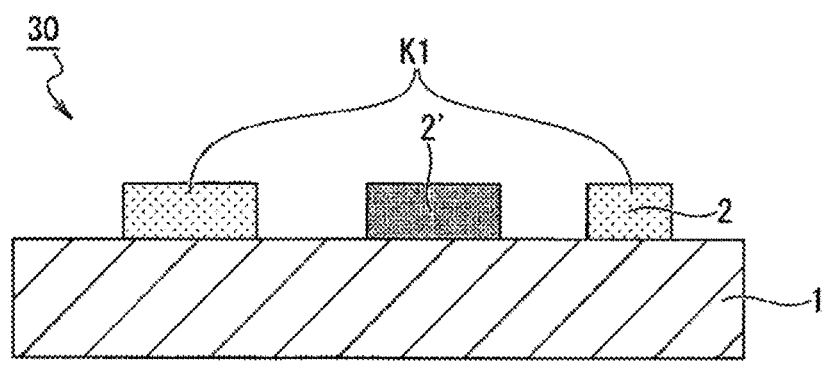
FIG. 3 is a schematic cross-sectional view illustrating a configuration of a decorative sheet according to a third embodiment of the present invention.

FIG. 3 is a schematic cross-sectional view illustrating a configuration of a decorative sheet 30 according to a third embodiment of the present invention. The decorative sheet 30 according to the third embodiment includes a silver pattern printed layer 2 and a color pattern printed layer 2' which are formed on the same plane of the base sheet 1. The silver pattern printed layer 2' is formed using silver nanoparticle ink provided in a decorative sheet 10 according to the first embodiment shown in FIG. 1. A color pattern printed layer 2' is formed using a coloring ink provided in the decorative sheet 20 according to the second embodiment shown in FIG. 2. Therefore, only the silver pattern printed layer 2 becomes a lustrous layer K1, and only the area where the lustrous layer K1 is formed shows a sense of brightness, resulting in the decorative sheet 30 having high design qualities. The silver pattern printed layer 2 formed using the silver nanoparticle ink may be formed first, or the color pattern printed layer 2' formed using the coloring ink may be formed first. In detail, the order in which the layers are formed on the base sheet 1 may be: forming the silver pattern printed layer 2 first, followed by forming the color pattern printed layer 2', or forming the color pattern printed layer 2' first, followed by forming the silver pattern printed layer 2. The silver pattern printed layer 2 is formed by an inkjet printing method using silver nanoparticle ink. The color pattern printing layer 2' is formed using coloring ink.

The silver pattern printed layer 2 (lustrous layer K1) and the color pattern printed layer 2' may be formed so that a part of the surface of the base sheet 1 is exposed as shown in FIG. 3, or the silver pattern printed layer 2 (lustrous layer K1) and the color pattern printed layer 2' may be formed so as to cover the entire surface of the base sheet 1.

Fourth Embodiment

Figure 4:
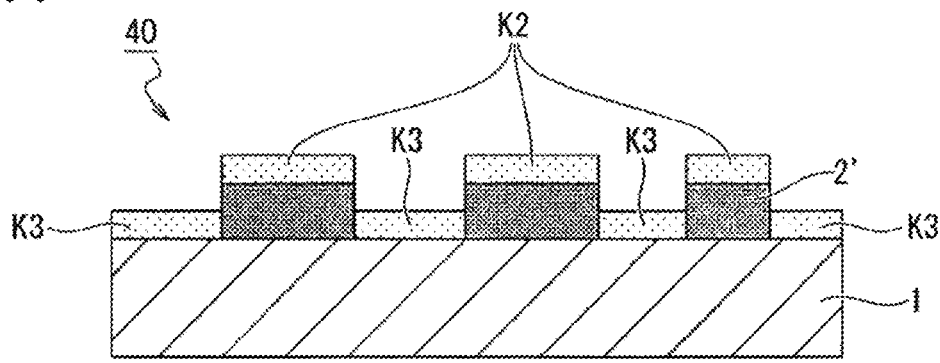
FIG. 4 is a schematic cross-sectional view illustrating a configuration of a decorative sheet according to a fourth embodiment of the present invention.

FIG. 4 is a schematic cross-sectional view illustrating a configuration of a decorative sheet 40 according to a fourth embodiment of the present invention. The decorative sheet 40 according to the fourth embodiment has, on a base sheet 1, a color pattern printed layer 2' formed using a coloring ink, and on the color pattern printed layer 2', a lustrous layer K2 which is a silver pattern printed layer 2 formed using a silver nanoparticle ink. Further, on the base sheet 1, a lustrous layer K3 which is the silver pattern printed layer 2 is formed using a silver nanoparticle ink. In other words, the decorative sheet 40 according to the fourth embodiment has the lustrous layer K3 formed in addition to the form of the decorative sheet 20 according to the second embodiment shown in FIG. 2. As a result, the decorative sheet 40 according to the fourth embodiment is partially colored and has high design properties that shows an overall sense of brightness.

Although not shown, the side surface of the color pattern printed layer 2' may also be covered with a lustrous layer (silver pattern printed layer 2).

As shown in FIG. 4, the silver pattern printed layer 2 (lustrous layer K2 and lustrous layer K3) may be formed to cover entire base sheet 1 and the color pattern printed layer 2', or may be formed to cover at least a part of the base sheet 1 and the color pattern printed layer 2' which is formed on the base sheet 1.

Fifth Embodiment

Figure 5:
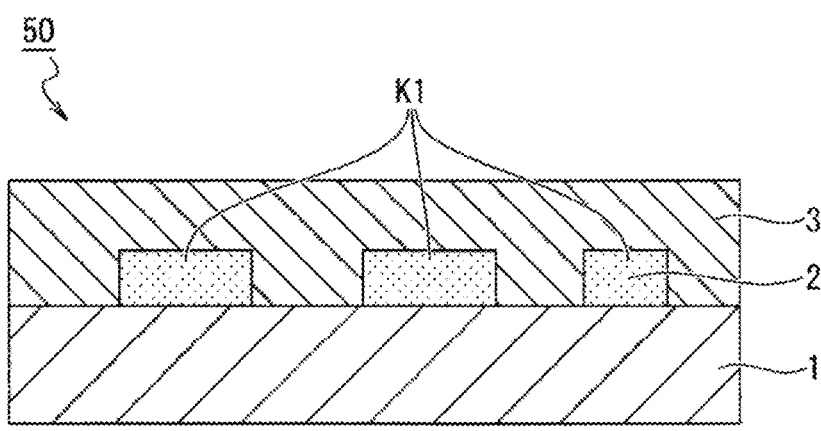
FIG. 5 is a schematic cross-sectional view illustrating a configuration of a decorative sheet according to a fifth embodiment of the present invention.

FIG. 5 is a schematic cross-sectional view illustrating a configuration of a decorative sheet 50 according to a fifth embodiment of the present invention. The decorative sheet 50 according to the fifth embodiment is provided with a surface protective layer 3 which covers the surface of the decorative sheet 10 according to the first embodiment shown in FIG. 1. In detail, the decorative sheet 50 has the surface protective layer 3 provided on the outermost surface layer of the decorative sheet 50.

Examples of materials for the surface protective layer 3 include thermosetting resins, ionizing radiation curable resins, or mixtures of these resins. Examples of thermosetting resins include thermosetting resins having urethane bonds such as two-part curing urethane resins. Examples of ionizing radiation curable resins include ultraviolet curable resins. Examples of ultraviolet curable resins include (meth) acrylic resins, silicone resins, polyester resins, urethane resins, amide resins, and epoxy resins. The use of these materials improves the hardness of the surface protective layer 3, and also enhances the surface physical properties, such as wear resistance, scratch resistance, and solvent resistance.

Additionally, in order to impart various functions, functional additives, such as an antimicrobial agent and an antifungal agent, may be added to the surface protective layer 3. An ultraviolet absorber or a light stabilizer may further be added to the surface protective layer 3, if necessary. Examples of ultraviolet absorbers include benzotriazole-based ultraviolet absorbers, benzoate-based ultraviolet absorbers, benzophenone-based ultraviolet absorbers, and triazine-based ultraviolet absorbers. For example, the light stabilizer may be a hindered amine-based light stabilizer. Furthermore, when contamination control performance and Sellotape (registered trademark) mold-release characteristics are required, a release agent having a silicone skeleton can be added. In this case, the type of release agent is not limited; however, the use of a silicone release agent having a terminal functional group that is reactive with the resin composition can improve contamination control performance and the durability of Sellotape (registered trademark) mold-release characteristics.

The decorative sheet 50 according to the fifth embodiment is configured to have the surface protective layer 3 to cover the surface of the decorative sheet 10 according to the first embodiment shown in FIG. 1. However, the decorative sheet 50 may, similarly, have the surface protective layer 3 to cover the respective surfaces of the decorative sheet 20 according to the second embodiment and the decorative sheet 30 according to the third embodiment shown in FIGS. 2 and 3.

The thickness of the surface protective layer 3 is not particularly limited as long as the surface protective layer 3 can cover the entire silver pattern printed layer 2 (lustrous layer K1), but is preferably in a range of 1 μm or more and 100 μm or less, and more preferably in a range of 10 μm or more and 80 μm or less. When the thickness of the surface protective layer 3 is within the numerical value range, the silver pattern printed layer 2 can be effectively protected and the flexibility of the decorative sheet 50 can be maintained.

Figure 6:
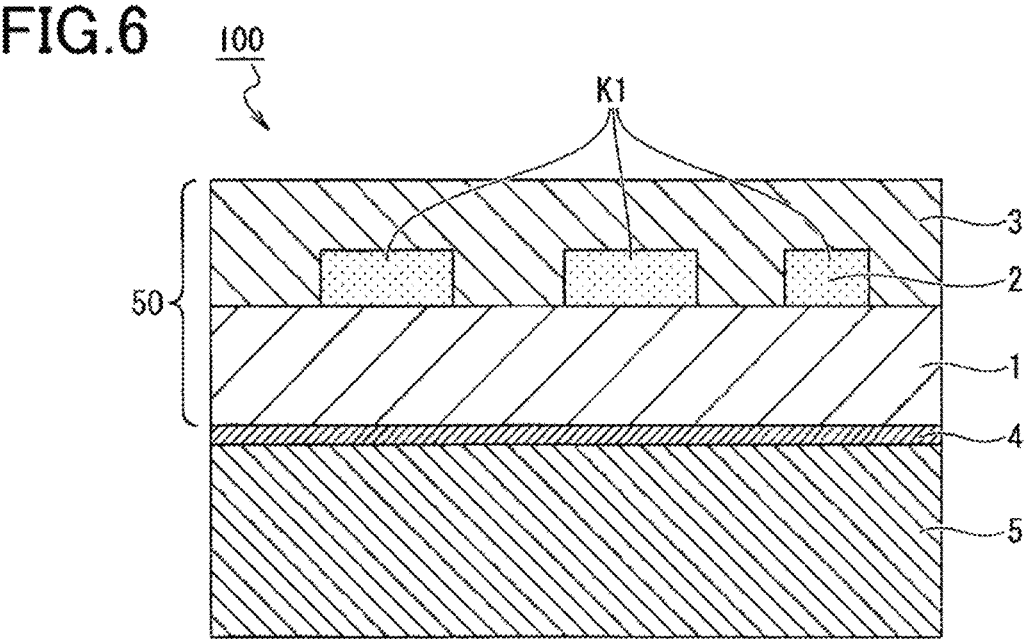
FIG. 6 is a schematic cross-sectional view illustrating a configuration of a decorative plate including a decorative sheet according to the first embodiment of the present invention.

FIG. 6 is a schematic cross-sectional view illustrating a configuration of a decorative plate 100 according to the first embodiment of the present invention. As shown in FIG. 6, the decorative plate 100 according to the present embodiment has a laminated structure in which the decorative sheet 50 shown in FIG. 5 is laminated on one surface of a substrate 5. An adhesive layer 4 is provided between the substrate 5 and the decorative sheet 50 such that the substrate 5 and the decorative sheet 50 are adhered via the adhesive layer 4.

For the substrate 5, for example, a wood plate such as plywood, particle board, medium density fiberboard (MDF), or hard board, or a metal plate can be used. Examples of the adhesive layer 4 include a thermoplastic resin and a thermosetting resin.

The decorative plate 100 shown in FIG. 6 has a laminated structure in which the decorative sheet 50 shown in FIG. 5 is laminated on one surface of the substrate 5. Similarly, the decorative plate 100 may have a laminated structure consisting of laminated decorative sheets, and each surface of the decorative sheet 20 of the second embodiment and the decorative sheet 30 of the third embodiment may be covered by the surface protective layer 3.

EXAMPLES

Example 1

The decorative sheet 30 according to the third embodiment shown in FIG. 3 was produced by the following material composition and steps, but the present invention is not limited to these.

Synthesis of Silver Oxalate 60 mL of distilled water was added to 9.92 g of oxalic acid dihydrate (KANTO CHEMICAL CO., INC.) which was dissolved by heating, and while stirring in an oil bath at 110° C., 26.7 g of silver nitrate (KANTO CHEMICAL CO., INC.) dissolved in 20 mL of distilled water by heating was added to the oil bath, and heating and stirring was continued for 1 hour. The precipitated silver oxalate was collected by natural filtration, and further filtered and washed with 200 mL of hot water and 50 mL of methanol (KANTO CHEMICAL CO., INC.), and dried at room temperature under reduced pressure in a light-shielded desiccator. The yield of silver oxalate thus obtained was 21.6 g (90.4% yield).

Synthesis of Silver Nanoparticles 0.13 g of oleic acid (KANTO CHEMICAL CO., INC.) was added to 3.26 g of N,N-diethyl-1,3-diaminopropane (Tokyo Chemical Industry Co., Ltd.), and then 1.90 g of silver oxalate obtained in the above step was further added, and the mixture was heated and stirred in an oil bath at 110° C. Within a minute, carbon dioxide effervescence occurred, and after a few minutes a brown suspension was produced. After heating the suspension for 5 minutes, then leaving until cool, 30 mL of methanol was added to the cooled suspension, and the precipitate obtained by centrifugation was dried naturally to obtain 1.48 g of silver nanoparticles (a standard silver yield of 97.0%) as a blue solid.

Figure 7:
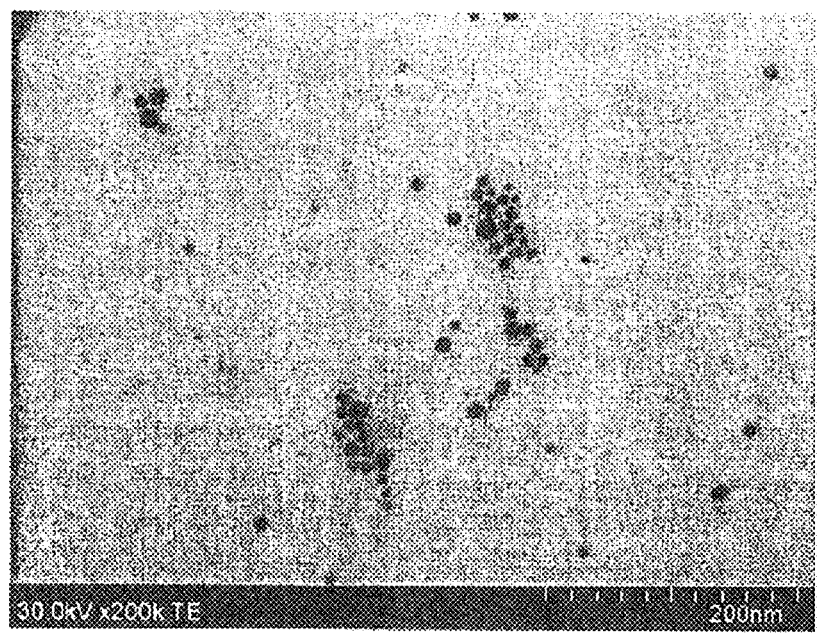
FIG. 7 is a view showing a scanning electron microscope image of silver nanoparticles observed after a toluene dispersion of silver nanoparticles obtained in Example 1 of the present invention is applied to a substrate and then dried.

The obtained silver nanoparticles were observed in S-TEM mode (acceleration voltage of 30 kV) using a scanning electron microscope (Hitachi High-Tech Corporation, SEM S-4800), and spherical particles having a particle size of approximately 5 to 20 nm were observed. The result is shown in FIG. 7. More specifically, FIG. 7 is a scanning electron microscope image of silver nanoparticles obtained in Example 1 after the toluene dispersion of silver nanoparticles was dropped onto a substrate (copper mesh microgrid) and then dried.

Figure 8:
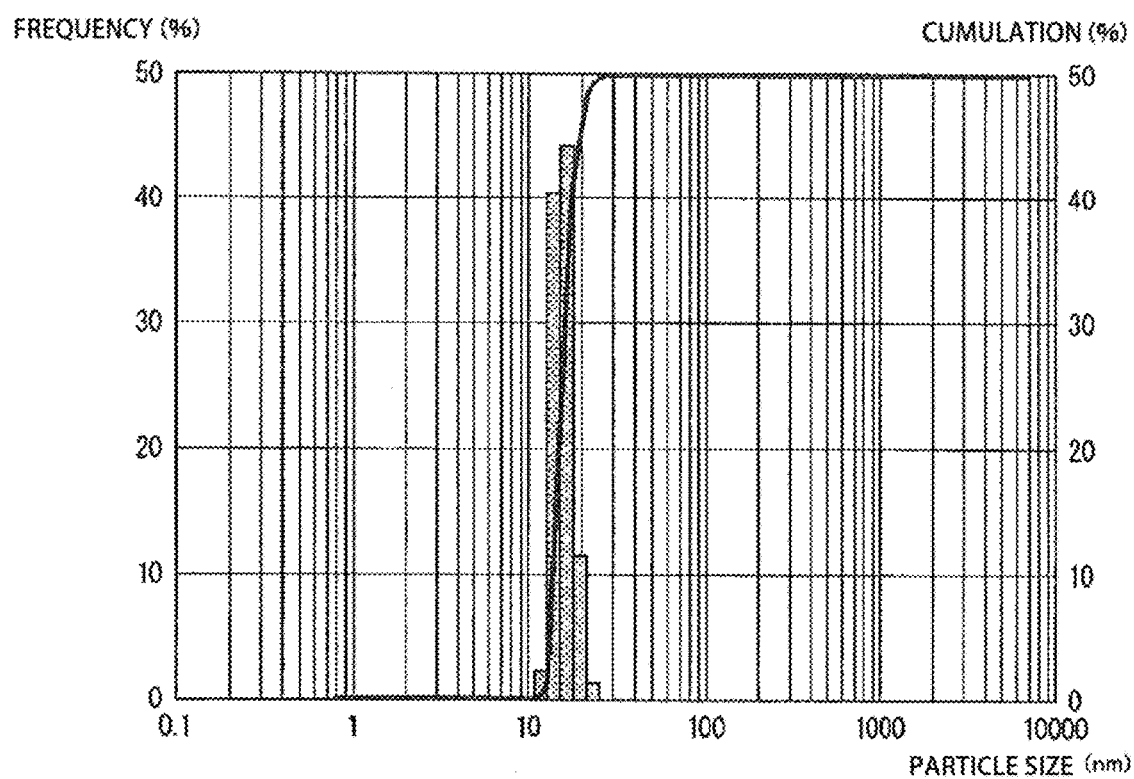
FIG. 8 is a diagram showing the particle size distribution and the cumulative frequency (%) of the silver nanoparticles obtained in Example 1 of the present invention.

Then, since the obtained silver nanoparticles were dispersed in toluene, dynamic light scattering particle size measurement (Nikkiso Co., Ltd., Nanotrac UPA-EX 150) of the toluene dispersion was performed. The result showed that the silver nanoparticles were well dispersed with an average particle size of 15 nm. The result is shown in FIG. 8. The solid line shown in FIG. 8 indicates the cumulative frequency (%).

[Preparation of Ink]

0.20 g of silver nanoparticles obtained in the above step was added to 1.8 g of toluene (KANTO CHEMICAL CO., INC.), and 0.2 g of terpineol (Isomer mixture, FUJIFILM Wako Pure Chemical Corporation), and stirred to form a dispersion. In this case, since 0.2 g of silver nanoparticles were used with respect to 2.0 g of the dispersion solvent, the mass % of the silver nanoparticles is 10%. The dispersion was filtered through a syringe filter (Whatman, 25 mm GD/X syringe filter (GF/B 1.0 μm)) to form silver nanoparticle ink for inkjet printing.

[Production of Decorative Sheet 30]

As the base sheet 1, PVC film (FZ manufactured by RIKEN TECHNOS CORPORATION) was used. Next, the wood grain pattern was printed as the color pattern printed layer 2' with an inkjet printer using inkjet inks (yellow, magenta, cyan) containing no lustrous pigment. Subsequently, on the same plane of the base sheet 1 on which the color pattern printed layer 2' is formed, a medium colored wood grain pattern was printed by an inkjet printer using the silver nanoparticle ink as the lustrous pattern printed layer 2. Further, as the surface protective layer 3, thermosetting polyfunctional acrylic urethane resin and silica encapsulated Acrydic (manufactured by DIC Graphics Corporation) were coated so that the thickness after drying was 1 μm.

The decorative sheet of Example 1 was produced in this way.

Example 2

Figure 9:
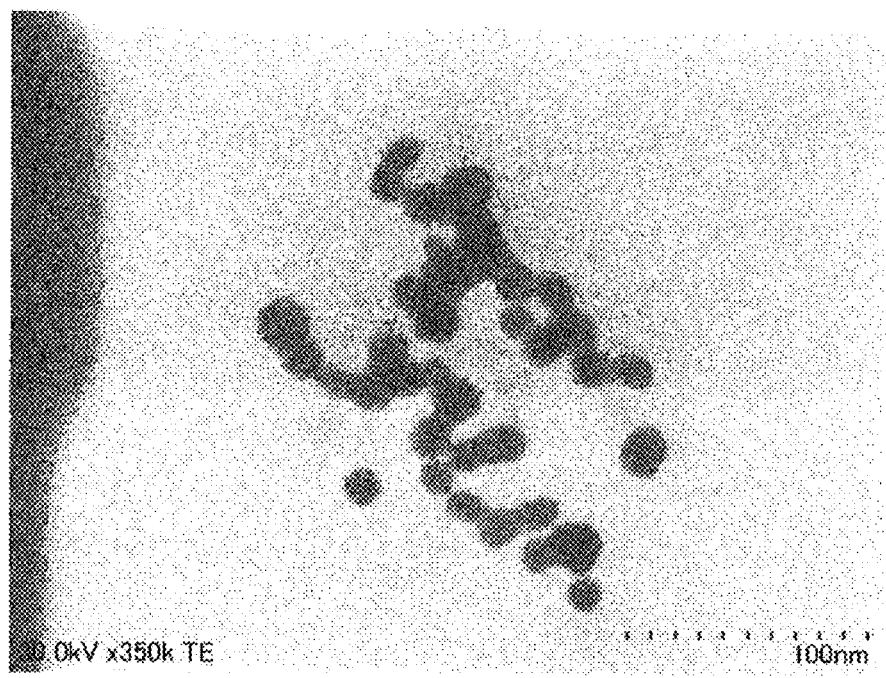
FIG. 9 is a view showing a scanning electron microscope image of silver nanoparticles observed after an n-butanol dispersion of silver nanoparticles obtained in Example 2 of the present invention is applied to a substrate and then dried.

In the synthesis of silver nanoparticles, silver nanoparticles were obtained in the manner similar to that in Example 1, except that a mixture of 1.43 g of n-hexylamine (Tokyo Chemical Industry Co., Ltd.) and 1.21 g of N, N-diethyl-1, 3-diaminopropane (Tokyo Chemical Industry Co., Ltd.) was used instead of 3.26 g of N, N-diethyl-1, 3-diaminopropane (Tokyo Chemical Industry Co., Ltd.). A scanning electron microscope image of the obtained silver nanoparticles is shown in FIG. 9. The obtained silver nanoparticles were processed in a manner similar to that in Example 1, except that n-butanol (KANTO CHEMICAL CO., INC.) was used as a dispersion medium instead of toluene and terpineol, and Plysurf A208F (DKS Co. Ltd.) was used as a dispersant to produce a decorative sheet of Example 2.

Example 3

Figure 10:
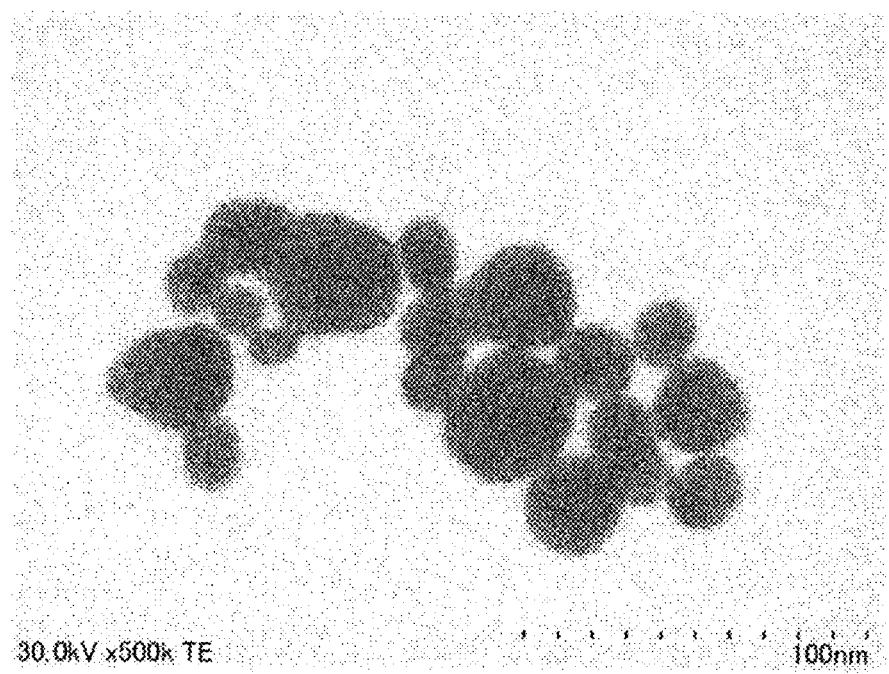
FIG. 10 is a view showing a scanning electron microscope image of silver nanoparticles observed after an n-butanol dispersion of silver nanoparticles obtained in Example 3 of the present invention is applied to a substrate and then dried.

The synthesis of silver nanoparticles was modified as follows. After 6.51 g of N, N-diethyl-1, 3-diaminopropane (Tokyo Chemical Industry Co., Ltd.), 0.25 g of oleic acid (KANTO CHEMICAL CO., INC.), and 9.60 g of n-butanol (KANTO CHEMICAL CO., INC.) were added together, 1.92 g of silver oxalate was added and heated and stirred in an oil bath at 95° C. After a few minutes of heating, the color began to change, and within 18 minutes, carbon dioxide effervescence occurred and the mixture became a brown suspension. After heating the suspension for 5 minutes, then leaving until cool, 30 mL of methanol was added to the cooled suspension, and the precipitate obtained by centrifugation was naturally dried to obtain 1.29 g of silver nanoparticles (a standard silver yield of 95.0%) as a blue solid. A scanning electron microscope image of the obtained silver nanoparticles is shown in FIG. 10. A decorative sheet of Example 3 was prepared in the manner similar to that in Example 2, using the obtained silver nanoparticles.

Example 4

Figure 11:
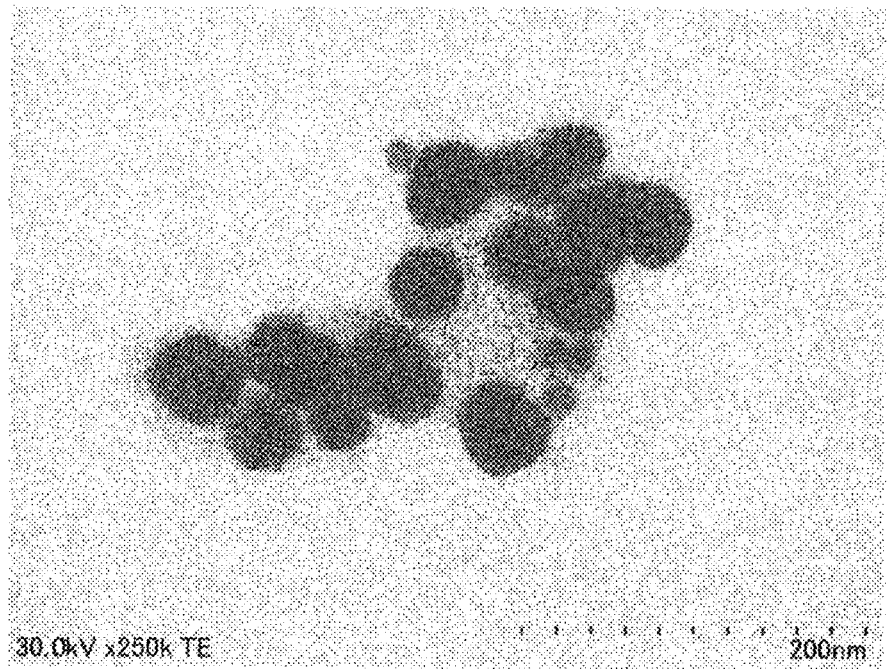
FIG. 11 is a view showing a scanning electron microscope image of silver nanoparticles observed after an n-butanol dispersion of silver nanoparticles obtained in Example 4 of the present invention is applied to a substrate and then dried.

In the synthesis of silver nanoparticles, silver nanoparticles were obtained in the manner similar to that in Example 3, except that a mixture of 1.47 g of n-hexylamine (Tokyo Chemical Industry Co., Ltd.) and 1.24 g of N, N-diethyl-1, 3-diaminopropane (Tokyo Chemical Industry Co., Ltd.) was used instead of 6.51 g of N, N-diethyl-1, 3-diaminopropane (Tokyo Chemical Industry Co., Ltd.). A scanning electron microscope image of the obtained silver nanoparticles is shown in FIG. 11. A decorative sheet of Example 4 was prepared in the manner similar to that in Example 2, using the obtained silver nanoparticles.

Example 5

Figure 12:
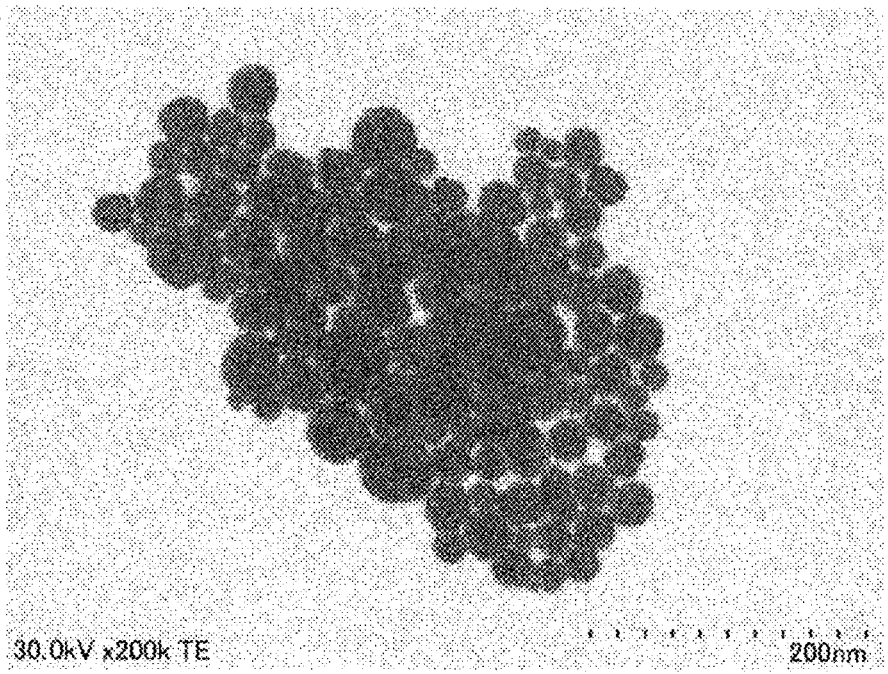
FIG. 12 is a view showing a scanning electron microscope image of silver nanoparticles observed after an n-butanol dispersion of silver nanoparticles obtained in Example 5 of the present invention is applied to a substrate and then dried.

For the synthesis of silver nanoparticles, silver nanoparticles were obtained in the manner similar to that in Example 3, except that n-hexanol (KANTO CHEMICAL CO., INC.) was used instead of n-butanol (KANTO CHEMICAL CO., INC.). A scanning electron microscope image of the obtained silver nanoparticles is shown in FIG. 12. A decorative sheet of Example 5 was prepared in the manner similar to that in Example 2, using the obtained silver nanoparticles.

Example 6

Figure 13:
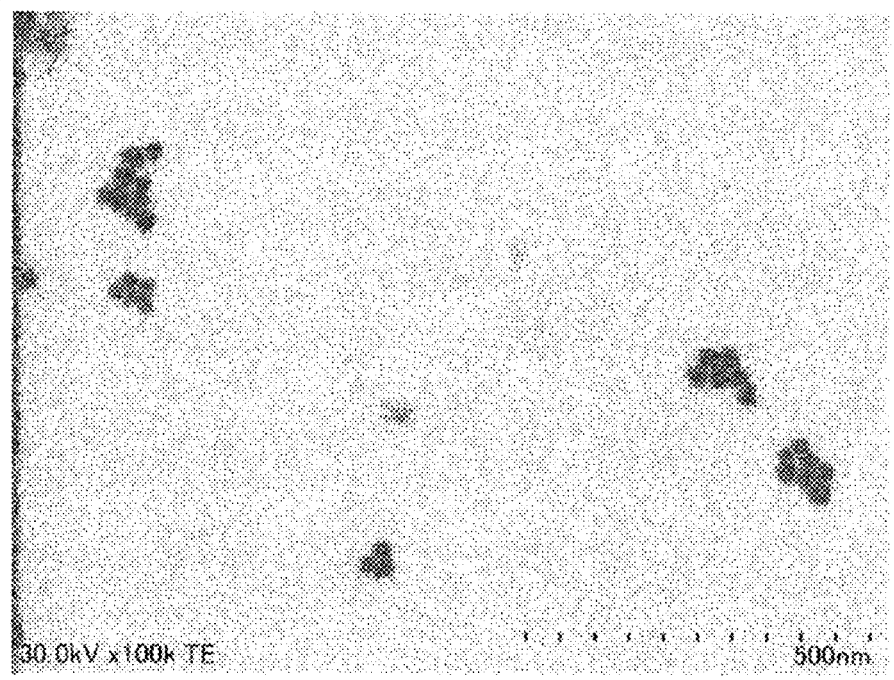
FIG. 13 is a view showing a scanning electron microscope image of silver nanoparticles observed after an aqueous dispersion of silver nanoparticles obtained in Example 6 of the present invention is applied to a substrate and then dried.

The synthesis of silver nanoparticles was modified as follows. 0.32 g of gelatin (KANTO CHEMICAL CO., INC.) and 2.56 g of N,N-dimethyl-1,3-diaminopropane (Tokyo Chemical Industry Co., Ltd.) were dissolved in 8.00 g of distilled water, to this, 0.96 g of silver oxalate was added, and the mixture was heated and stirred in an oil bath at 100° C. for 3 hours. When the reaction solution was cooled down, the reaction solution was diluted with 50 mL of distilled water, and the precipitate obtained by centrifugation was dried naturally to give 0.61 g of silver nanoparticles (standard silver yield of 90.0%). A scanning electron microscope image of the obtained silver nanoparticles is shown in FIG. 13. The obtained silver nanoparticles were processed in the manner similar to that in Example 1, except that water was used as a dispersion medium and Plysurf AL (DKS Co. Ltd.) was used as a dispersant to produce a decorative sheet of Example 6.

Example 7

The synthesis of silver nanoparticles was changed as follows to prepare silver nanoparticles whose surface was modified with polyvinylpyrrolidone. To a dispersion medium prepared by adding 2.4 g of polyvinylpyrrolidone K30 (FUJIFILM Wako Pure Chemical Corporation) to 4.0 g of water to prepare an aqueous solution, 0.48 g of silver oxalate was added and heated and stirred in an oil bath at 80° C. The mixture was heated and stirred for 5 hours to obtain a grayish dispersion. The obtained dispersion was cooled, and 40 mL of water was added thereto, and separated by centrifugation (Avanti HP-26 XP, 15,000 rpm, 30 minutes, manufactured by Beckman Coulter, Inc.) to obtain 0.35 g of a gray solid. The obtained silver nanoparticles were processed in the manner similar to that in Example 1, except that water was used as a dispersion medium and Plysurf AL (DKS Co. Ltd.) was used as a dispersant to prepare a decorative sheet of Example 7.

Example 8

A decorative sheet of Example 8 was prepared in the manner similar to that in Example 1, except that silver nanoparticles manufactured by OSAKA SODA CO., LTD. were used as the silver nanoparticles, cyclohexanone was used as a dispersion medium, and that Plysurf AL (DKS Co. Ltd.) was used as a dispersant.

D50 of silver nanoparticles manufactured by OSAKA SODA CO., LTD. was measured and was 265 nm.

Comparative Example 1

A decorative sheet of Comparative Example 1 was prepared as in Example 1, except that a wood grain pattern was printed with a gravure printer using gravure ink (Lamister (registered trademark) manufactured by TOYO INK CO., LTD.) containing lustrous pigment as the lustrous pattern printed layer.

Comparative Example 2

A decorative sheet of Comparative Example 2 was prepared as in Example 1, except that a wood grain pattern was printed as the pattern printed layer with an inkjet printer using UV ink (manufactured by KONICA MINOLTA, INC.) containing no lustrous pigment.

Comparative Example 3

A decorative sheet of Comparative Example 3 was prepared as in Example 1, except that a wood grain pattern was printed as the pattern printed layer with an inkjet printer using UV silver ink (manufactured by MIMAKI ENGINEERING CO., LTD.) containing no silver nanoparticles.

[Evaluation Method]

The brightness was rated as "good" when more than 50 out of 100 subjects evaluated that the brightness of wood grain is natural and that the natural gloss of natural wood could be reproduced, and the brightness was rated as "poor" when more than 50 out of 100 subjects evaluated that the brightness of the wood grain is unnaturally strong or when the brightness of the wood grain is too weak which resulted in failure to reproduce the natural gloss of natural wood. When the evaluation resulted in the rating of "good", it was considered that the decorative sheet had no problem in use and thus it was determined as "pass".

The design was rated as "good" when more than 50 out of 100 subjects felt that the outline of the fine lines (width of several μm) of the wood grain pattern could be reproduced properly without blurring. On the other hand, the design was rated as "poor" when the subjects felt that the outline of the fine lines (width of several μm) of the wood grain pattern was blurred and could not be reproduced, whereas the design was rated as "average" when the subjects felt that the printing was partially uneven. A microscope with a magnification factor of 100 was used to check the contour of the fine lines of the wood grain pattern. When the evaluation resulted in the rating of "good" or "average", it was considered that the decorative sheet had no problem in use and thus it was evaluated as "acceptable".

[Evaluation Results]

Table 1 shows the evaluation results of Examples 1 to 6 and Comparative Examples 1 to 3.

TABLE 1

| | Example 1 | Example 2 | Example 3 | Example 4 | Example 5 | Example 6 | Example 7 |
|---|---|---|---|---|---|---|---|
| LUMINANCE | GOOD | GOOD | GOOD | GOOD | GOOD | GOOD | GOOD |
| DESIGN | GOOD | GOOD | GOOD | GOOD | GOOD | GOOD | AVERAGE |

| | | Example 8 | Comparative Example 1 | Comparative Example 2 | Comparative Example 3 |
|---|---|---|---|---|---|
| | LUMINANCE | GOOD | GOOD | POOR | POOR |
| | DESIGN | AVERAGE | POOR | GOOD | GOOD |

As shown in Table 1, the brightness and the designability of the decorative sheets of Example 1 to 6 which all satisfy the conditions of the present invention were both good. In Examples 7 and 8, although the brightness of the decorative sheets was sufficient, uneven print was observed. Comparative Example 1, in which a gravure printing machine was used, resulted in blurry thin lines and insufficient design. Comparative Example 2, in which UV ink containing no lustrous pigments was inkjet printed, resulted in a lack of brightness. Comparative Example 3, in which UV silver ink containing no silver nanoparticles was inkjet printed, resulted in excessive luminance.

[Reference Signs List] 1 . . . Base sheet; 2 . . . Silver pattern printed layer (lustrous pattern printed layer); 2' . . . Color pattern printed layer; K1, K2, K3 . . . Lustrous layer; 3 . . . Surface protective layer; 4 . . . Adhesive layer; 5 . . . Substrate; 10, 20, 30, 40, 50 . . . Decorative sheet; 100 . . . Decorative plate.

What is claimed is:

1. A decorative sheet, comprising:
   a base sheet;
   a color pattern printed layer formed directly on the base sheet using a coloring ink;
   a lustrous pattern printed layer, which is formed on the by inkjet printing an inkjet ink containing silver nanoparticles coated with a compound selected from the group consisting of $RNH_2$, a diamine compound a plurality of amino groups, and polyvinylpyrrolidone, wherein R is a hydrocarbon group and wherein a lustrous pattern of the lustrous pattern printed layer is formed by the silver nanoparticles, wherein a composition of the coloring ink is different from a composition of the inkjet ink.

2. The decorative sheet of claim 1, wherein a median diameter (D50) of the silver nanoparticles is in a range of 1 nm or more and 250 nm or less.

3. The decorative sheet of claim 1, wherein a surface protective layer is provided on an outermost surface layer of the decorative sheet.

4. A decorative plate, comprising:
   the decorative sheet of claim 1; and
   a substrate disposed on a portion of the decorative sheet which faces the base sheet.

5. The decorative sheet of claim 1, wherein the compound is selected from the group consisting of ethylamine, n-propylamine, isopropylamine, 1,2-dimethylpropylamine, n-butylamine, isobutylamine, n-nonylamine, n-aminodecane, n-aminoundecane, n-hexadecylamine, n-heptadecylamine, n-octadecylamine and n-oleylamine.

6. The decorative sheet of claim 1, wherein the amine compound is selected from the group consisting of N, N-dimethylethylenediamine, N, N-diethylethylenediamine, N, N-dimethyl-1, 3-propanediamine, N, N-diethyl-1, 3-propanediamine, N, N-dimethyl-1, 5-diamino-2 methylpentane, N, N-dimethyl-1, 6-hexanediamine, N, N-dibutylaminopropane, N, N-diisobutyl 1, 3-diaminopropane.

7. The decorative sheet of claim 1, wherein the compound is polyvinylpyrrolidone.

* * * * *